United States Patent
Yi

(10) Patent No.: US 7,517,405 B2
(45) Date of Patent: *Apr. 14, 2009

(54) COMPOSITION FOR SOLIDIFYING SOIL AND INDUSTRIAL WASTE

(75) Inventor: Kap-Sok Yi, Bogota, NJ (US)

(73) Assignee: Charista Global Corp, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/819,474

(22) Filed: Jun. 27, 2007

(65) Prior Publication Data

US 2008/0300325 A1 Dec. 4, 2008

(30) Foreign Application Priority Data

Jun. 1, 2007 (KR) ............... 10-2007-0053880

(51) Int. Cl.
*C08L 95/00* (2006.01)
*C04B 24/36* (2006.01)
*C04B 24/04* (2006.01)
*C04B 18/30* (2006.01)
*C04B 18/04* (2006.01)
*C04B 18/00* (2006.01)

(52) U.S. Cl. ............... 106/669; 588/252; 588/5; 516/39; 106/668; 106/671; 106/697; 106/802; 106/803; 106/810; 106/811; 106/273.1; 106/277; 106/278; 106/281.1; 106/284.03

(58) Field of Classification Search ............. 516/39; 106/668, 669, 671, 697, 802, 803, 810, 811; 106/273.1, 277, 278, 281.1, 284.03; 588/5, 588/252

See application file for complete search history.

(56) References Cited

U.S. PATENT DOCUMENTS

| 4,018,730 A | * | 4/1977 | McDonald | .......... 106/277 |
| 4,676,927 A | * | 6/1987 | Schilling et al. | .......... 516/47 |
| 5,336,438 A | * | 8/1994 | Schilling et al. | .......... 516/43 |

FOREIGN PATENT DOCUMENTS

KR 10-0619939 8/2005

OTHER PUBLICATIONS

Derwent Abstract on East, week 200747, London: Derwent Publications Ltd., AN 2007-480627, KR 619939 B1, (Samchang New Tech), abstract.*
Derwent Abstract on East, week 200769, London: Derwent Publications Ltd., AN 2007-734864, KR 619938 B1, (Samchang New Tech), abstract.*

* cited by examiner

*Primary Examiner*—Daniel S Metzmaier
(74) *Attorney, Agent, or Firm*—IPLA P.A.; James E. Bame

(57) ABSTRACT

Disclosed herein is a composition for solidifying soil and industrial waste. The solidifying composition contains 16-24 wt % of straight asphalt, 0.06-0.10 wt % of an emulsifier for asphalt, 0.8-1.2 wt % of light oil, heavy oil or a mixture thereof, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and the balance of water. A solidified material formed using this solidifying composition has increased density, strength and elasticity, improved durability and a short curing time. Furthermore, the solidifying composition enables soil and industrial waste to be recycled as a substitute for stone materials, such that it allows material sources to be readily secured in public or construction work fields, leading to a reduction in construction cost, and can also contribute to the preservation of the natural environment.

3 Claims, No Drawings

COMPOSITION FOR SOLIDIFYING SOIL AND INDUSTRIAL WASTE

BACKGROUND OF THE INVENTION

1. Field of the Invention

The present invention relates to a composition for solidifying soil and industrial waste, and more particularly to a composition for solidifying soil and industrial waste, which contains straight asphalt as a main component and can be added to a single kind of or a mixture of soil, such as decomposed granite soil, mud, river sand and sea sand, a single kind of industrial waste or a mixture of industrial waste, such as slag, powder slag, waste concrete and sludge, and a small amount of cement, to form solidified materials which can be used as substitutes for stone materials.

2. Description of the Prior Art

These days, due to the difficulty in securing good-quality construction materials for public works and construction industries, the construction period is lengthened, which increases expenses. Also, to secure construction materials, stony mountains are exploited or aggregate is extracted from rivers, sea floors and the like, thus destroying the natural environment and disturbing ecosystems. Specifically, because granular materials such as stone materials are used in harbor landfill and asphalt and concrete paving, fields and mountains are destroyed to quarry stones, and stone cutting, transport and breaking works act as factors that increase construction expenses. In addition, because general soil is used in most riverbank construction, dikes break due to the reduction in durability and safety caused by scouring resulting from water stream pressure, resulting in flood damage and the spread of disease. Also, in the case of soft ground improvement according to the prior art, a high construction cost is incurred and the loss of the material used is high.

To solve these problems, there have been attempts to recycle soil and industrial waste, widely available in Korea, as a substitute for stone materials in various public works and other construction industries.

In such attempts, cement stabilization methods, LAC (lignin rosin asphalt concrete) methods and the like have been developed and used. However, materials according to these methods have a long curing time, making it difficult to obtain early compressive strength, and also have a low compressive strength of 100 kgf/cm$^2$. For this reason, the application of these materials has been limited to sub-base layer materials in road construction and the like.

In another attempt, Korean Patent Laid-Open Publication No. 1996-29280 discloses a method for curing a mixture of industrial waste and soil using a curing agent composition. In this method, the curing agent composition comprises 25% sodium carbonate, 25% potassium chloride, 15% magnesium carbonate, 10% ammonium chloride, 8% potassium silicate, 7% silicate, 5% ferrous sulfate and 5% titanium oxide. The curing agent is described as being suitable for solidifying a mixture of industrial waste and soil, but it contains sodium carbonate and potassium chloride as main components, and thus is expensive. Also, the strength of solidified materials prepared using the curing agent is not greatly increased, and thus there is a need to develop a solidifying agent which can further increase the strength of solidified materials.

As described above, stone materials can be used in a wide range of applications, including harbors, seashores, roads, airports, water resource development, soil and public works, but the resources thereof are restricted. For this reason, there has been an urgent demand for a method of making it possible to recycle industrial waste, which is generated in construction fields in large amounts and is readily available, and soil, such as decomposed granite soil.

According to this demand, the present inventors filed a patent application relating to a solidifying composition containing 25-35 wt % of emulsified asphalt, 0.05-0.20 wt % of an emulsifier for asphalt, 0.1-0.3 wt % of hydrochloric acid, 0.01-0.05 wt % of calcium chloride, 0.1-0.5 wt % of lignin, 0.01-0.05 wt % of oleic acid, 0.005-0.030 wt % of a surfactant, and the balance of water (Korean Patent Application No. 2005-0070705, filed on Aug. 2, 2005). However, this composition has problems in that it contains emulsified asphalt, which increases the production cost of the composition, and it shows insufficient impact resistance or low flexibility.

SUMMARY OF THE INVENTION

The present inventors have conducted many studies on a solidifying composition capable of solving the prior problems, using, as a main material, straight asphalt among various petroleum asphalts. As a result, the present inventors have found that, when the solidifying composition of the present invention is mixed with soil, industrial waste or a mixture thereof, and a small amount of cement to prepare a solidified material, the prepared solidified material has increased density, strength and elasticity, excellent durability and a short curing time, and thus can be used as a construction material, public work material and the like instead of stone materials, thereby completing the present invention.

It is an object of the present invention to provide a composition for solidifying soil and industrial waste, which contains straight asphalt as a main component and can be added to soil, industrial waste or a mixture thereof to prepare a solidified material which can be used as a substitute for stone material.

To achieve the above object, the present invention provides a composition for solidifying soil and industrial waste, which contains 16-24 wt % of straight asphalt, 0.06-0.10 wt % of an emulsifier for asphalt, 0.8-1.2 wt % of light oil, heavy oil or a mixture thereof, 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and the balance of water.

Preferably, the inventive composition for solidifying soil and industrial waste is a 3-5-fold dilution of the solidifying composition, prepared by adding 200-400 parts by weight of water to 100 parts by weight of the solidifying composition.

DETAILED DESCRIPTION OF THE INVENTION

Hereinafter, the present invention will be described in further detail.

The inventive composition for solidifying soil and industrial waste comprises, as essential elements, straight asphalt, an emulsifier for asphalt, light oil, heavy oil or a mixture thereof, calcium chloride, lignin, an acrylic emulsion-based asphalt modifier, sodium hydroxide, oleic acid, and water. The composition serves to impart effective strength to soil and industrial waste and prevent cracks caused by drying and shrinkage.

Generally, petroleum asphalt is obtained in processes for producing petroleum-based products, such as petroleum refining, and can be divided into straight asphalt, asphalt cement, cutback asphalt, emulsified asphalt, blown asphalt, modified asphalt and the like. Among them, the straight asphalt is the heaviest fraction contained in crude oil, and is residue obtained by completely removing light fractions by distillation in a high vacuum through a vacuum distillation system. It has high elongation and adhesion, and the softening point thereof is generally lower than 65° C. It is used mainly for road pavement and airport pavement. Such straight asphalt is commercially available under the trade names of AP-3, AP-5, etc. from asphalt production companies in Korea, and thus it can be used without any additional processing, thus reducing production cost. In the present invention, the straight asphalt serves to increase the elasticity and stability of mixed particles, including soil or industrial waste, cement and a solidifying agent, and to waterproof surfaces. If it is contained in an amount of less than 16 wt %, the stability and adhesion of the composition will be insufficient due to a reduction in the elasticity between particles, and if it is contained in an amount of more than 24 wt %, it will increase the product cost and reduce strength. For this reason, it is contained in an amount of 16-24 wt % based on the total weight of the composition.

The emulsifier for asphalt has good degradability due to its high emulsifying ability, and is thus used to emulsify asphalt. As the emulsifier, any emulsifier can be used without any particular limitation as long as it is a cationic or non-ionic emulsifier. If it is contained in an amount of less than 0.06 wt %, it will not emulsify asphalt, and if it is contained in an amount of more than 0.10 wt %, it will increase product costs, and its emulsifying function can decrease instead of increasing. For this reason, the emulsifier is contained in an amount of 0.06-0.10 wt % based on the total weight of the solidifying composition.

Light oil, heavy oil or a mixture thereof is used to solve the phenomenon in which, when straight asphalt is used in its unmodified state, it will have low penetration, will be readily solidified at room temperature, and will thus be very difficult to emulsify. If it is contained in an amount of less than 0.8 wt %, the emulsification of straight asphalt will not be easy, and if it is contained in an amount of 1.2 wt %, straight asphalt will not be easily solidified after emulsification. For this reason, it is contained in an amount of 0.8-1.2 wt % based on the total amount of the solidifying composition.

Calcium chloride serves as a catalyzing agent to promote moisture absorption together with water absorption and prevent freezing. If it is contained in an amount of less than 0.01 wt %, it will not sufficiently absorb moisture, and thus will have an insufficient effect on the prevention of freezing, and if is contained in an amount of 0.03 wt %, a large amount of anhydrides will be generated, making it difficult to maintain the solidifying composition in the liquid state. For this reason, it is contained in an amount of 0.01-0.03 wt % based on the total weight of the solidifying composition.

Lignin serves to disperse raw materials, such as soil, industrial waste and cement, and bind cement to raw materials to increase the strength of the raw materials. If it is contained in an amount of less than 0.8 wt %, the dispersion of particles will be insufficient and the strength of the resulting material will be reduced, and if it is contained in an amount of more than 1.2 wt %, it will interfere with the chemical reaction of other materials because it has a three-dimensional network structure. For this reason, it is contained in an amount of 0.8-1.2 wt % based on the total weight of the solidifying composition.

The acrylic emulsion-based asphalt modifier serves to disperse and distribute fine particles and is used to adhere particles to each other because it has excellent adhesion. It also has an excellent waterproofing effect. If it is contained in an amount of less than 0.7 wt %, it will not emulsify asphalt or the like, and if it is contained in an amount of more than 1.3 wt %, it will increase the adhesion between particles, but will increase product costs. For this reason, it is contained in an amount of 0.7-1.3 wt % based on the total weight of the solidifying composition. Preferably, the modifier is a styrene-butadiene-styrene (SBS) block copolymer. For example, Butonal NS 198 (manufactured by BASF, USA) can be used.

Sodium hydroxide serves to decompose organic materials and absorb moisture and carbon dioxide in the air to form sodium carbonate, which controls the concentration of the emulsion. It also acts to adjust the pH of the emulsion. If it is contained in an amount of less than 0.13 wt %, it will reduce the concentration and viscosity of the emulsion and make the emulsion strongly acidic or basic, and if it is contained in an amount of more than 0.21 wt %, it will reduce the concentration and viscosity of the emulsion, make emulsion strongly acidic or basic and cause environmental problems. For this reason, it is contained in an amount of 0.13-0.21 wt % based on the total weight of the solidifying composition.

Oleic acid, a kind of fatty acid surfactant, is used as an emulsifying agent and serves to facilitate the absorption of other materials into mixed particles. Also, it acts to penetrate the inner surface of mixed particles to increase the waterproof property of the inner surface and reduce solidification in freezing weather. If it is contained in an amount of less than 0.22 wt %, the waterproof property of the composition will be reduced, and if it is contained in an amount of more than 0.34 wt %, it will form a suspension. For this reason, it is contained in an amount of 0.22-0.34 wt % based on the total weight of the solidifying composition.

Water is contained to form the rest of the above-described components, and the content thereof is adjusted according to the kind and wettability of product. If water is contained in an excessively small amount, emulsification and dispersion will not sufficiently occur, and the cost of the composition will increase, and if it is contained in an excess amount, it will reduce the adhesion between particles, waterproofing ability and strength of the composition. For this reason, the content of water should also be adjusted to be within a suitable range. Most preferably, it is contained in an amount of about 70-80 wt % based on the total weight of the solidifying composition.

The prior solidifying composition containing emulsified asphalt showed insufficient impact resistance and low flexibility. However, in the solidifying composition of the present invention, straight asphalt, having lower penetration than that of emulsified asphalt, is used, and light oil, heavy oil or a mixture thereof is used to emulsify the straight asphalt to increase the penetration of the straight asphalt. Moreover, in the solidifying composition of the present invention, sodium hydroxide is used instead of the prior surfactant to improve the decomposition of organic materials so as to maintain the composition in a stable emulsion. Furthermore, the acrylic emulsion-based asphalt modifier is used to improve abrasion resistance, impact resistance, flexibility, low stress, release, heat resistance and weather resistance.

The solidifying composition of the present invention can be prepared by mixing the above components with each other. Alternatively, it can also be prepared in the form of a dilution by further adding water to the composition to a given concentration. Particularly, the solidifying composition of the present invention can be prepared as a 3-5-fold dilution using 200-400 parts by weight of water to 100 parts by weight of the solidifying composition. In this case, the dilution can be added directly to soil, industrial waste and cement without carrying out a separate process of adding water to the composition in the preparation of solidified material.

The solidifying composition prepared by mixing the above components with each other is added together with a small amount of cement to solidify soil and industrial waste. As the soil, any soil can be used without any particular limitation as long as it is generally classified as one of general soil, including decomposed granite soil, mud, river sand, sea sand, and natural soil, and it is preferable to use decomposed granite soil alone or a mixture of decomposed granite soil and other soil. As used herein, the term "industrial waste" is generally used to mean an unnecessary surplus generated in a building or area occupied by an industrial firm, and material classified as waste is generally limited to solid waste, including waste oil. In the present invention, any waste can be used as long as it is classified as one of waste in a broad sense, including sludge, residue, ash, and environmental waste. Preferably, slag, generated in furnaces, powder slag, waste concrete, and sludge, remaining after the dressing of various ores, are used alone or in a mixture of two or more thereof. In the present invention, soil or industrial waste can be used alone or in a mixture, and a mixture of soil and industrial waste may also be used.

Solidified material prepared by adding the inventive solidifying composition to soil, industrial waste or a mixture thereof and a small amount of cement has increased density, strength and elasticity, excellent structural durability at high temperature, and also a short curing time. Thus, the solidified material can be used as a substitute for stone material in public works or construction works.

TEST EXAMPLE 1

In order to evaluate the strengths of soil or industrial waste specimens prepared by adding the solidifying composition to soil or industrial waste, the basic physical properties of decomposed granite soil, slag, powder slag, sludge and waste concrete, which were used in the following preparation examples, were tested and measured according to the testing methods shown in Table 1 below. The measurement results are shown in Table 2 below. For each of the tests, a representative sample was sampled by a quartering method from materials delivered to out laboratory.

TABLE 1

| Basic physical properties | Test methods |
| --- | --- |
| Moisture content | KS F 2306 |
| Specific gravity | KS F 2308 |
| Liquid limit | KS F 2303 |
| Plastic limit | KS F 2304 |
| Particle size | KS F 2302 |
| Sieve analysis | KS F 2309 |

TABLE 2

| Samples | Water content (Wn) (%) | Specific gravity (Gs) (ton/m$^3$) | Liquid limit (LL) (%) | Plastic limit (PP) (%) | Pass through #200 sieve (%) | Particle size (USCS) |
|---|---|---|---|---|---|---|
| Decomposed granite soil | 19.6 | 2.65 | 29.1 | 13.6 | 12.9 | coarse-grained soil |
| Slag | 15.8 | 3.05 | — | — | 0.60 | — |
| Powder slag | 14.3 | 3.05 | — | — | 7.52 | — |
| Sludge | 16.4 | 3.01 | — | — | 62.8 | — |
| Waste concrete | 13.4 | 2.98 | — | — | 2.07 | — |

Hereinafter, the present invention will be described in further detail with reference to examples and comparative examples. It is to be understood, however, that these examples are illustrative only and the scope of the present invention is not limited thereto.

EXAMPLES 1 to 3 and COMPARATIVE EXAMPLE 1 to 4

Straight asphalt (AP-3; manufactured by SK Corporation, Korea) or emulsified asphalt (AP-3; manufactured by SK Corporation, Korea) was stored in a separate storage tank at a temperature higher than 130° C. In another storage tank, a mixture containing quantified amounts of an emulsifier for asphalt (Farmin ST-7; Kao Corp., Japan), light oil, calcium chloride, lignin, an acrylic emulsion-based asphalt modifier (Butonal NS198, BASF, USA), sodium hydroxide, oleic acid and water was stored at a temperature of 80° C. The asphalt and the mixture were placed and emulsified in a homogenizer, thus preparing solidifying compositions of Examples and Comparative Examples. Herein, each of the components was added in the amount shown in Table 3 below.

PREPARATION EXAMPLES 1 to 7 and COMPARATIVE PREPARATION EXAMPLES 1 to 4

Preparation of Specimens 4-fold dilutions were prepared in advance by adding 300 parts by weight of water to 100 parts by weight of the solidifying compositions of Examples 1-3 and Comparative Examples 1-4, prepared according to the components and contents shown in Table 3. According to the compositions shown in Tables 4 and 5 below, Portland cement (manufactured by Tong Yang Cement Corp, Korea) was mixed with each of the prepared solidifying composition dilutions. Then, each of the samples (soil or industrial waste) was placed in a cylindrical mold having two joints on both sides to form three layers and was rammed 25 times for each layer, thus forming a specimen having a 50 mm diameter and a 100 mm height. Herein, water leakage or deformation did not occur at the joints and the upper and lower ends, and mineral oil was applied to the inner surface of the mold such that the specimen could be easily separated from the mold after curing. After

TABLE 3

| Components (wt %) | Examples | | | Comparative Examples | | | |
|---|---|---|---|---|---|---|---|
| | 1 | 2 | 3 | 1 | 2 | 3 | 4 |
| Straight asphalt | 20.0 | 16.0 | 24.0 | 12.0 | 20.0 | 20.0 | — |
| Emulsified asphalt | — | — | — | — | — | — | 20.0 |
| Emulsifier for asphalt | 0.08 | 0.06 | 0.10 | 0.08 | 0.08 | 0.08 | 0.08 |
| Light oil | 1.0 | 0.8 | 1.2 | 1.0 | 0.5 | 1.0 | 1.0 |
| Calcium chloride | 0.02 | 0.01 | 0.03 | 0.02 | 0.02 | 0.02 | 0.02 |
| Lignin | 1.0 | 0.8 | 1.2 | 1.0 | 1.0 | 1.0 | 1.0 |
| Acrylic emulsion-based asphalt modifier | 1.0 | 0.8 | 1.2 | 1.0 | 1.0 | 0.5 | 1.0 |
| Sodium hydroxide | 0.17 | 0.13 | 0.21 | 0.17 | 0.17 | 0.17 | 0.17 |
| Oleic acid | 0.28 | 0.22 | 0.34 | 0.28 | 0.28 | 0.28 | 0.28 |
| Water | Balance | Balance | Balance | Balance | Balance | Balance | Balance | completion of this process, the specimen was cured for 7 days by immersion in water. After the completion of curing for 7 days, the specimen was separated from the mold, and the upper and lower ends thereof were ground to a flatness of less than 0.05 mm. The soil and industrial waste used herein were the representative samples used in Test Examples 1.

TABLE 4

| Components (parts by weight) | | Preparation Examples | | | Comparative Preparation Examples | | | |
|---|---|---|---|---|---|---|---|---|
| | | 1 | 2 | 3 | 1 | 2 | 3 | 4 |
| Dilution of solidifying composition | Example 1 | 4 | — | — | — | — | — | — |
| | Example 2 | — | 4 | — | — | — | — | — |
| | Example 3 | — | — | 4 | — | — | — | — |
| | Comparative Example 1 | — | — | — | 4 | — | — | — |
| | Comparative Example 2 | — | — | — | — | 4 | — | — |
| | Comparative Example 3 | — | — | — | — | — | 4 | — |
| | Comparative Example 4 | — | — | — | — | — | — | 4 |
| Cement | Portland cement | 10 | 10 | 10 | 10 | 10 | 10 | 10 |
| Soil or industrial waste | Decomposed granite soil | 100 | 100 | 100 | 100 | 100 | 100 | 100 |

TABLE 5

| Components (parts by weight) | | Preparation Examples | | | |
|---|---|---|---|---|---|
| | | 4 | 5 | 6 | 7 |
| Dilution of solidifying composition | Example 1 | 4 | 4 | 4 | 4 |
| | Comparative Example 1 | — | — | — | — |
| | Comparative Example 2 | — | — | — | — |
| | Comparative Example 3 | — | — | — | — |
| | Comparative Example 4 | — | — | — | — |
| Cement | Portland cement | 10 | 10 | 10 | 10 |
| Soil or industrial waste | Slag | 100 | — | — | — |
| | Powder slag | — | 100 | — | — |
| | Waste concrete | — | — | 100 | — |
| | Sludge | — | — | — | 100 |

TEST EXAMPLE 2

Each of the specimens prepared in Preparation Examples 1-7 and Comparative Preparation Examples 1-4 was cured for 7 days and 28 days. Then, according to KS F 2405, the upper and lower surfaces of a pressurizing plate of a tester were cleaned, and the prepared specimen was placed on the pressurizing plate such that it coincided with the central axis of the pressurizing plate. Then, a load was placed on the specimen at a given speed such that an impact was not applied to the specimen. The application speed of the load was such that the increase in compression stress was 2-3 kgf/cm² per second. After the specimen started to deform rapidly, controlling the application speed of the load was stopped and the load was continuously applied to measure the uniaxial compressive strength of the specimen. The measurement results are shown in Table 6 below.

TABLE 6

| | Uniaxial compressive strength (kg f/cm²) | |
|---|---|---|
| | Curing for 7 days | Curing for 28 days |
| Preparation Example 1 | 158.41 | 250.28 |
| Preparation Example 2 | 158.03 | 260.74 |
| Preparation Example 3 | 162.22 | 259.55 |
| Preparation Example 4 | 108.93 | 175.37 |
| Preparation Example 5 | 100.85 | 168.41 |
| Preparation Example 6 | 90.18 | 142.48 |
| Preparation Example 7 | 68.34 | 118.22 |
| Comparative Preparation Example 1 | 92.29 | 152.27 |
| Comparative Preparation Example 2 | 100.34 | 159.54 |
| Comparative Preparation Example 3 | 98.05 | 164.72 |
| Comparative Preparation Example 4 | 91.38 | 146.20 |

As can be seen in Table 6 above, the decomposed granite soil treated with the solidifying composition of the present invention (Preparation Examples 1-3) showed the highest compressive strength, and the compressive strength was gradually decreased in the order of slag (Preparation Example 4), powder slag (Preparation Example 5), waste concrete (Preparation Example 6) and sludge (Preparation Example 7). The specimens prepared in Preparation Examples 1-3, using decomposed granite soil, all showed a compressive strength higher than 250 kgf/cm² when they were cured for 28 days. Also, the specimens prepared in Preparation Examples 4-7 by using slag, powder slag, waste concrete or sludge and adding only 10 parts by weight of cement showed a minimum compressive strength of 118.22 kgf/cm² when they were cured for 28 days. On the other hand, the compressive strengths of the decomposed granite soil not treated with the inventive solidifying composition (Comparative Examples 1-4) were markedly lower than those of the decomposed granite soil treated with the solidifying composition of the present invention (Preparation Examples 1-3).

The solidifying composition of the present invention can be used to prepare solidified materials having various strengths by adjusting the curing time and the amounts of cement and the solidifying composition. Thus, solidified materials formed using the inventive solidified composition can be applied in various fields.

In Preparation Examples of the present invention, the specimens were prepared using soil or industrial waste alone, but solidified materials that can be formed using the inventive solidifying composition are not limited thereto, and can also be prepared using a mixture of soil, a mixture of industrial waste or a mixture of soil and industrial waste.

Specifically, when cement and soil, industrial waste or a mixture thereof are solidified by mixing them with the inventive solidifying composition at a given ratio, and then are subjected to a curing process, they can be applied in harbor and seashore landfill works, base layers and sub-base layers in roads and airports, and base layers in runways and aircraft transfer roads, and can be used in the fields of water resources developments, including the construction and repair of river banks and the construction of soil dams. Particularly, solidified materials prepared using the inventive solidifying composition can substitute for watertight mud, which has been used as the material of a core wall in the construction of soil dams, and thus they can prevent the environment from being damaged due to the extraction of mud. In addition, the solidified materials can be applied for the replacement and improvement of soft ground in the soil and ground field.

As is apparent from the foregoing, the solidifying composition can contain domestically produced straight asphalt, can be stored for a long period of time due to its excellent storage stability, and has excellent waterproofing properties. Also, solidified materials of soil or industrial waste, formed using the inventive solidifying composition, have excellent density, strength, elasticity and durability, and thus can be used as a substitute for stone materials. Also, they can be advantageously used in high-temperature and high-humidity areas, because external impact or pressure is relieved because it is absorbed by asphalt.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A composition for solidifying soil and industrial waste, which contains 16-24 wt % of straight asphalt, 0.06-0.10 wt % of an emulsifier for asphalt that is a cationic or non-ionic emulsifier, 0.8-1.2 wt % of light oil, heavy oil or a mixture thereof 0.01-0.03 wt % of calcium chloride, 0.8-1.2 wt % of lignin, 0.7-1.3 wt % of an acrylic emulsion-based asphalt modifier, 0.13-0.21 wt % of sodium hydroxide, 0.22-0.34 wt % of oleic acid, and the balance of water.

2. The composition of claim 1, wherein the acrylic emulsion-based asphalt modifier is a styrene-butadiene-styrene (SBS) block copolymer.

3. A 3-5-fold dilution of the composition of claim 1, prepared by adding 200-400 parts by weight of water to 100 parts by weight of the composition of claim 1.

* * * * *